(12) United States Patent
Paolone

(10) Patent No.: US 8,734,874 B1
(45) Date of Patent: May 27, 2014

(54) BEVERAGE BREWING LID AND SYSTEM AND METHOD INCORPORATING SUCH A LID

(75) Inventor: Alfonso Ernesto Paolone, Weston, FL (US)

(73) Assignee: UCAI Holdings LLC, Weston, FL (US)

( * ) Notice: Subject to any disclaimer, the term of this patent is extended or adjusted under 35 U.S.C. 154(b) by 281 days.

(21) Appl. No.: 13/152,765

(22) Filed: Jun. 3, 2011

Related U.S. Application Data

(60) Provisional application No. 61/355,855, filed on Jun. 17, 2010.

(51) Int. Cl.
*B65B 29/02* (2006.01)
*B65D 85/804* (2006.01)
*A23F 5/24* (2006.01)

(52) U.S. Cl.
CPC ............ *B65D 85/8043* (2013.01); *A23F 5/243* (2013.01)
USPC ................ 426/77; 426/78; 426/80; 426/431; 426/432; 426/433; 426/394; 426/115; 220/254.1; 220/713; 220/714; 99/298; 99/304; 99/323; 99/323.3

(58) Field of Classification Search
CPC ..... A23F 5/243; A23F 5/246; B65D 85/8043; B65D 85/8046; B65D 2543/00046; B65D 47/248
USPC ......... 99/298, 304, 323, 323.3, 295; 426/431, 426/15, 77, 78, 79, 80, 432, 433, 394, 115; 220/714, 254.1, 713
See application file for complete search history.

(56) References Cited

U.S. PATENT DOCUMENTS

| | | | |
|---|---|---|---|
| 3,054,593 A * | 9/1962 | Baxter | ........................... 251/203 |
| 6,076,450 A | 6/2000 | DiGiorgio, Jr. | |
| 6,314,866 B1 | 11/2001 | Melton | |
| 7,387,063 B2 | 6/2008 | Vu et al. | |

\* cited by examiner

*Primary Examiner* — Rena L Dye
*Assistant Examiner* — Lela S Williams
(74) *Attorney, Agent, or Firm* — Laurence A. Greenberg; Werner H. Stemer; Ralph E. Locher

(57) ABSTRACT

A beverage cup lid and a system and method incorporating such a lid is provided. The lid holds an individual serving dose of a beverage to be brewed. Hot water is poured into a chamber of the lid to brew the beverage. The brewed beverage is fed into an underlying cup through an outlet in the lid. The beverage can be consumed through an opening in the lid without removing the spent grounds contained in the lid, from which the beverage was brewed.

19 Claims, 12 Drawing Sheets

BEVERAGE BREWING LID AND SYSTEM AND METHOD INCORPORATING SUCH A LID

CROSS-REFERENCE TO RELATED APPLICATIONS

The present application claims priority to Provisional Patent Application No. 61/355,855, filed on Jun. 17, 2010, entitled "Single Serving Beverage Brewing Lid and a System and Method Incorporating Such a Lid"; that application being incorporated herein, by reference, in its entirety.

BACKGROUND OF THE INVENTION

1. Field of the Invention

The invention relates to a beverage cup lid and, more particularly, to a beverage lid containing a individual serving dose of a beverage to be brewed and to a system and method incorporating such a lid.

2. Description of the Related Art

The drip method for preparing brewed beverages was invented by M. de Belloy in the 1800s. This drip method is, today, still one of the most used traditional methods for brewing beverages, since a soft and aromatic extraction can be obtained by it, particularly with the coffee.

However, classic, traditional dripping and filtering brewing systems, such as the use of thermo-type industrial percolators, produce a hot beverage in large quantities that is consumed, in some cases, in small quantities over long periods of time. The earlier prepared beverage remains heating on a burner, which causes the quality and freshness of these beverages to suffer over time. What is needed is a system for providing an end user with the same type of final infusion that can be obtained from large-scale coffee machines having traditional dripping and filtering brewing systems, but is made by the individual serving.

Individual serving beverage container lids are known. For example, U.S. Pat. No. 6,314,866 to Melton discloses a lid for covering an associated beverage container including an infuser unit attached to the underside of the cover piece. In Melton, upon placement of the cover piece onto the opening in the lid, the infuser unit is fully or partially immersed into the liquid in the beverage and brewing of the beverage commences.

U.S. Pat. No. 6,076,450 to DiGiorgio, Jr., discloses a brewer device for brewing single servings of a beverage, while also functioning as a cup closure lid. The lid of DiGiorgio includes a filter assembly to hold a brew substance, such as coffee grounds. In operation, hot liquid is poured through the top filter and bottom filter of DiGiorgio, contacts the coffee grounds between the filters and exits out of the bottom filter into the cup until the cup is filled the desired amount.

U.S. Pat. No. 7,387,063 to Vu et al., discloses a beverage brewing system adapted to have a brewing configuration, in which, a brewing chamber has a brewing substance therein, a bottle initially has a fluid therein, a lid is located over a cup, the bottle is removably attached to the lid and located over the lid, the brewing chamber is located between the bottle and the cup, and a blow-out valve is located between the bottle and the brewing chamber so that the blow-out valve initially hinders a flow of the fluid from the bottle to the brewing chamber. In Vu, the blow-out valve is adapted to be breached at a predetermined pressure when the fluid is heated to allow the fluid to pass through the brewing chamber into the cup to form a brewed fluid. The entire system of Vu is designed to be disposable and microwavable.

What is needed is an individual serving beverage container lid wherein the beverage is brewed by a controlled pouring of the hot water onto grounds contained in the lid prior to the liquid being received in the cup. What is additionally needed is an individual serving beverage container lid wherein the hot water is gravity fed in a controlled way from the top of the lid to the bottom of the lid, and into a cup disposed under the lid.

SUMMARY OF THE INVENTION

In order to overcome the above-mentioned disadvantages of the heretofore-known devices of this general type, it is accordingly an object of the invention to provide an individual serving beverage cup lid and a system and method incorporating such a lid. The lid holds an individual serving dose of a beverage to be brewed. In one particular embodiment of the invention, the lid is disposable and comes prepackaged with the individual serving dose encapsulated in a chamber therein. In one particular embodiment of a method for using such a lid, hot water is poured into a chamber of the lid to brew the beverage. The brewed beverage is gravity fed through an outlet opening in the lid and into the underlying cup. In one particular embodiment of the invention, the beverage can be consumed through an opening in the lid without removing the spent grounds from which the beverage was brewed.

Although the invention is illustrated and described herein as embodied in an individual serving beverage brewing lid and a system and method incorporating such a lid, it is nevertheless not intended to be limited to the details shown, since various modifications and structural changes may be made therein without departing from the spirit of the invention and within the scope and range of equivalents of the claims.

The construction of the invention, however, together with the additional objects and advantages thereof will be best understood from the following description of the specific embodiments when read in connection with the accompanying drawings.

DESCRIPTION OF THE PREFERRED EMBODIMENTS

Figure 1A:
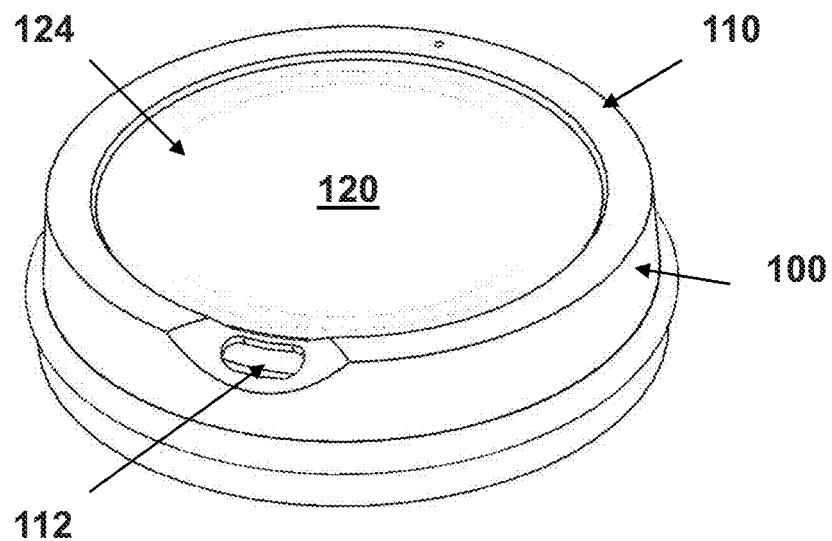
FIG. 1A is a top perspective view of a beverage lid in accordance with one particular embodiment of the present invention.
Figure 1B:
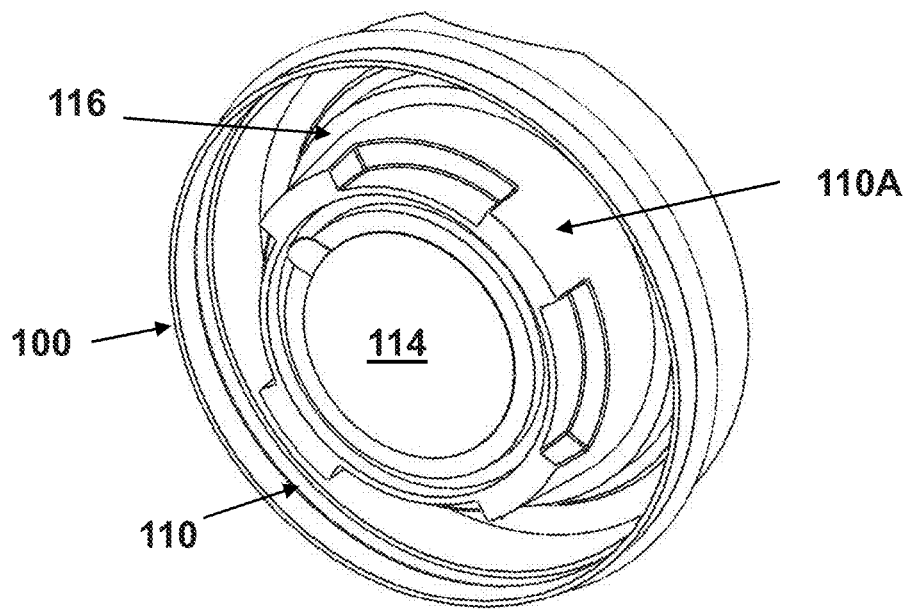
FIG. 1B is a bottom perspective view of a beverage lid in accordance with one particular embodiment of the present invention.

Referring now to FIGS. 1A-6A, there is shown an individual serving beverage brewing lid 100 in accordance with one particular embodiment of the present invention. The lid 100 is designed to be removable, and secured to the lip of cup. In the present particular embodiment, both the cup and the lid are preferably disposable, for example, the cup is a disposable paper or polystyrene foam cup as is presently available for drinking hot beverages. Note, however, that this is not meant to be limiting, as the lid of the instant invention can be adapted for use with other types of cups, including non-disposable cups. For example, in one particular embodiment of the present invention, the lid 100 is configured to be used as the lid of a conventional, reusable "travel mug", as shown more particularly in FIGS. 6C and 6D.

Additionally, the lid 100 includes a shell 110 and a beverage kit 120 seated in the shell 110. The shell 110 additionally includes an opening or slot 112 passing therethrough, through which a beverage can be consumed without removing the lid 100 from the underlying cup. When placed atop a cup, the lid 100 provides, generally, the features of:

preventing hot or cold liquid contained in the cup to spill out;

preventing items and/or elements of nature occurring outside of the cup from falling into the liquid held in the cup; and serving as an exit guide for the liquid, i.e., to conduct the liquid to the mouth of the consumer.

Additionally, a lid 100, in accordance with the present invention, provides the specialized functions of:

facilitating the transfer of a hot fluid through the lid;

receiving and housing beverage pods containing a dose of product;

providing a filter for filtering the product from the fluid during brewing;

providing an interface and chamber for facilitating the brewing process;

providing a funneling guide for the prepared infusion; and containing the spent grounds separately from the beverage being consumed through the lid.

In particular, the lid 100 of the present invention permits beverages to be selected and brewed in individual doses (i.e., single serving), in a manner that is easy, practical and convenient for the consumer. Additionally, the lid 100 is configured to guarantee freshness of the product and offer protection barriers from external environmental elements that could degrade freshness of the product, such as oxygen and sun light. This is advantageous over previous dripping and filtering brewing systems, such as industrial thermo type percolators, where hot beverages are prepared in large quantities and small consumption in many cases causes these beverages to stay prepared for long periods of time under constant heat, thus degrading the quality and freshness of the beverage.

To accomplish the aforementioned objects, the shell 110 of the lid 100 includes a well chamber 110A configured to receive and hold a beverage kit 120. In one preferred embodiment of the invention, the beverage kit 120 is an integrated unit containing, among other things, a beverage pod 122 containing a single dose 122C of a brewable beverage constitutant, such as a single dose of pre-packaged flavored or unflavored coffee grounds, tea leaves and/or powdered drink pre-mixes. In one particular embodiment, the powder or grounds housed within the beverage pod 122 are kept fresh by a first freshness seal or sticker 124 at the top of the beverage kit 120, as well as by a second freshness seal or sticker 114, disposed on the outside bottom of the shell 110, opposite the well 110A.

The seals or stickers 114, 124 provide a barrier that helps keep oxygen and sunlight from affecting the dose of product 122C stored in the lid 100. This will guarantee the freshness and quality of the product. Optionally, to avoid further oxygen infiltration, the lid 100 can be impregnated with nitrogen under a controlled environment. The bottom safety seal 114 provides, among other things: 1) a barrier guaranteeing the controlled interior environment of the lid 100; and 2) protection from external elements that can stick to the drainage/siphon system of the lid 100. As will be described more fully in connection with FIG. 6A, herebelow, the seal/sticker 114 is removed from the lid 100 prior to use.

The beverage pod 122 is a self contained, pre-packaged unit including a "dose" of product 122C (i.e., an individual serving portion of the powder, leaves or grounds used to brew the beverage contained in a filter material). In one embodiment of the invention, the interior storage capacity or volumetric area of the well chamber 110A is fixed (i.e., non-variable), but is sized to accommodate beverage pods of different weights and/or volumes to permit greater variety for user selection. Thus, a user can be presented with a variety of lids (A, B, C of Step 1 of FIG. 6A), each offering a different beverage option. For example, a user could select a particular lid 100 prepackaged with a beverage pod 122 containing a maximum amount of product for a dark or extra bold infusion, or, alternately, a lesser amount of powder for a light or medium infusion, based on user preference and according to the label on the particular lid 100. Similarly, a user can select a particular lid 100 prepackaged with a beverage pod 122 based on the size of the cup in which the beverage is to be made (i.e., 8, 10, 12 or 16 oz). However, in each case, the size and shape of the pod would be uniform, so that each pod, regardless of the amount of product constituting a dose, will be received into the well chamber 110A in the same manner.

As can be seen more particularly in FIGS. 1B, 2A-2B and 3A, the well chamber 110A of the shell 110 can include a small circumferential lip 116 towards the top of the well chamber 110A for engaging a correspondingly sized lip 122B on the top edge of the pod 122, by which the edge of the pod will be supported. At the bottom of the well chamber 110A, four pronounced structures 118 are provided to act as pedestals and support the bottom surface of the pod 122. These supporting structures 118 also serve to support the bottom surface of a well chamber of another shell 110 when a plurality of shells 110 (i.e., without the beverage kits 120) are stacked during the production process. More particularly, as shown in FIG. 3B, in one particular preferred embodiment of the invention, the cavity of the well chamber 110A has a conical shape, that is, the diameter at the top of the cavity or volumetric space is bigger than the bottom diameter of the well chamber 110A, and this form more easily facilitates the stacking of the shells 110 during production. This is particularly useful during the automatic mass production of the lids 100.

Additionally, in one particular embodiment of the invention illustrated in FIGS. 2A, 2B, 5A, 5B and 5C, the beverage kit 120 includes a circular water transfer screen assembly 130. The circular water transfer screen assembly 130 is another innovative feature of the lid 100 and provides advantages in the brewing process. More particularly, the circular water transfer screen assembly 130 is a unique element composed of two components: 1) a circular gate lid 130A; and 2) a water transfer screen ring 130B. In one particular embodiment, the water transfer screen ring 130B is formed as a rigid part, while the circular gate lid 130A is designed to be flexible and to include a one-way, self-sealing valve 130C and a thermoformed freshness seal or sticker feature 124. The one-way, self-sealing valve 130C may be provided in any configuration, as desired. In one particular embodiment, of the invention, the one-way, self-sealing valve 130C is configured as a "Venturi-style" valve, having an hourglass cross-section that allows a rubber-coated tube (210, 230 of FIGS. 6B and 7), to pass therethrough, and which will close automatically after the tube has been removed therefrom. In another particular embodiment of the invention, not shown, a smaller, hourglass-shaped, one-way, self-sealing valve can be received into a hole or well formed in and through the circular gate lid 130A, the walls of which are arranged to circumferentially compress the self-sealing valve, to ensure reclosure of a hole in the self-sealing valve after the tube has been removed.

The circular gate lid 130A is formed with a lip that engages a shoulder portion of the water transfer screen ring, such that the lid 130A is fixed to the ring 130B with a free space therebetween. This free space defines a cavity or chamber inside the circular water transfer screen assembly 130, as shown in FIG. 2B. Additionally, the circular gate lid 130A optionally includes a one-way, self-sealing valve 130C for permitting a delivery tube 210, with a rubber jacket 230, to pass therethrough, to pour water and to create a water seal between the tube and the one-way, self-sealing valve (i.e., hot water, in the present preferred embodiment) into the cavity between the circular gate lid 130A and the water transfer screen ring 130B, as shown more particularly in FIG. 5C. Water poured into the cavity of the circular water transfer screen assembly 130 will flood the cavity and exit the screen assembly 130 as scattered showers, via holes 130D in the floor of the water transfer screen ring 130B, thus flooding the entire superior flat upper surface 122A of the beverage pod 122. The circular gate lid 130A serves the further purpose of preventing hot water that may remain in the circular water transfer screen assembly 130 from exiting the lid 100 when the beverage cup lid is inclined during use. Thus, the circular water transfer screen assembly 130 has the function of guaranteeing, in a secure and efficient way that, at the moment of drinking, no external spill from the beverage kit 120 will occur.

As discussed hereinabove, and as shown more particularly in FIGS. 1A-2B and 3C, the beverage kit 120 sits in the well 110A of the shell 110 of the lid 100. In one particular embodiment of the invention, the lid 100, including the beverage kit 120 prepackaged therein, is sold as an integral, unit that is disposed of once consumed. However, it should be noted that the shell 110 need not be disposable, but rather, could be molded or formed from plastic that is reusable (i.e., such as a beverage travel mug lid 300 shown in FIGS. 6C and 6D). In such a case, the encapsulated beverage pod 122 could be safely removed from the well 110A, so that the used beverage pod 122 can be disposed of after the beverage has been made and consumed.

Figure 3A:
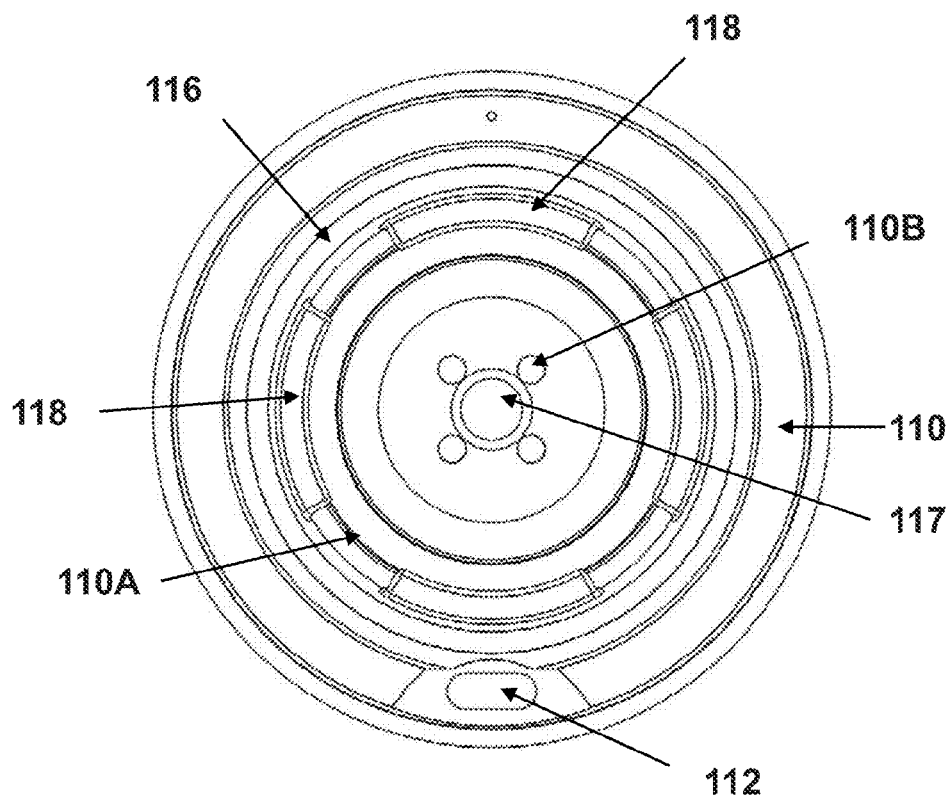
FIG. 3A is a top plan view of a beverage lid shell made in accordance with one particular embodiment of the present invention.

As shown more particularly in FIG. 3A, the shell 110 of the present embodiment is made to have an internal diameter to fit a standard-sized cup available today. The shell 110 additionally includes a die-cut spout including an opening 112 for an ergonomic fit to the end user's mouth, to permit comfortable drinking through the lid. Such a shell 110 can be made using a thermoforming process and with a material that prevents infiltration of oxygen, such as high impact polystyrene. Note that other forming methods and/or materials could be used, as desired.

Figure 3B:
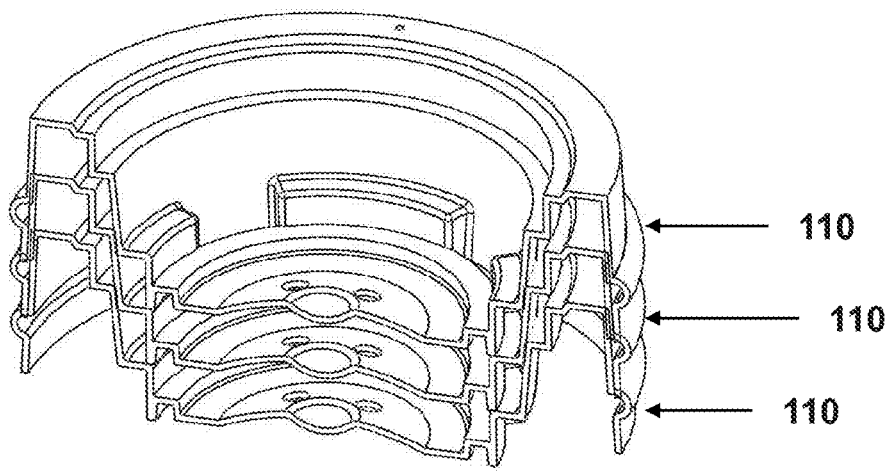
FIG. 3B is a side plan partial cut-away view of a stack including a plurality of beverage lid shells in accordance with one particular embodiment of the present invention.
Figure 3C:
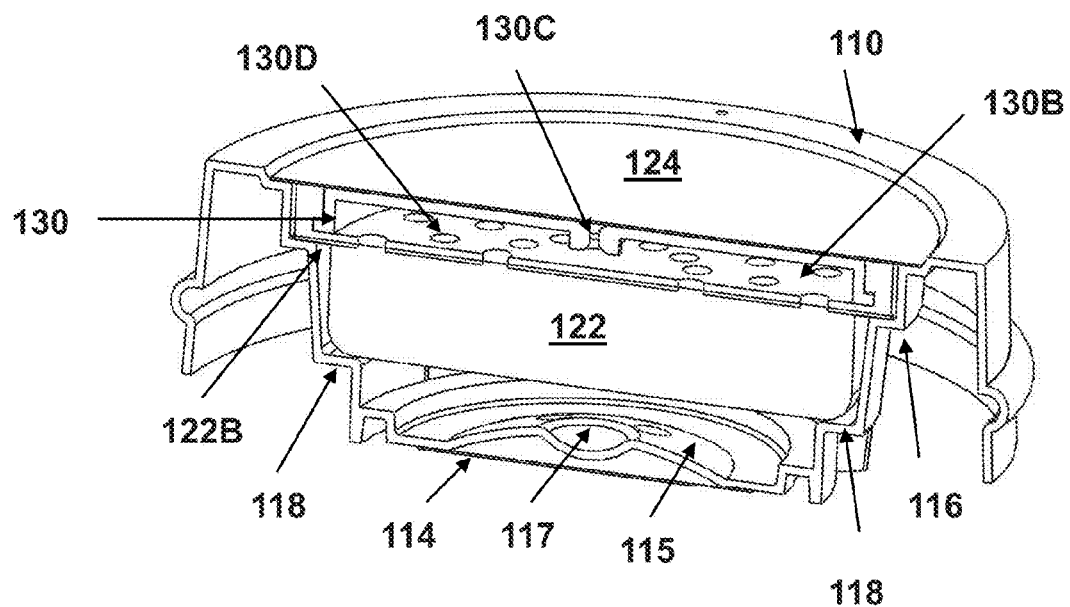
FIG. 3C is a side plan cut-away view of a beverage lid in accordance with one particular embodiment of the present invention.

Additionally, in the present embodiment, the top lip of the shell 110 has been designed to support the thermoformed freshness seal or sticker 124 on the upper surface of the lid 100, which will hermetically seal all the contents of the beverage kit 120 into the well chamber 110A of the shell 110, as shown more particularly in FIG. 3C. In one particular embodiment illustrated in FIG. 3C, the upper face of the lid 100 designed to be completely flat, so as to support the head of a brewing machine, as will be described more particularly in connection with FIG. 7.

Figure 3D:
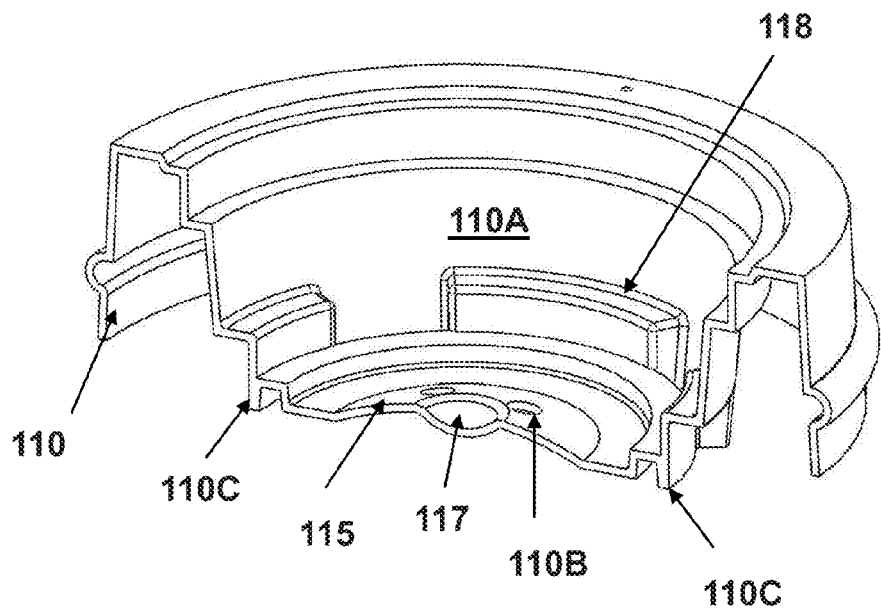
FIG. 3D is a partial cut-away view of a beverage lid shell in accordance with one particular embodiment of the present invention.
Figure 4:
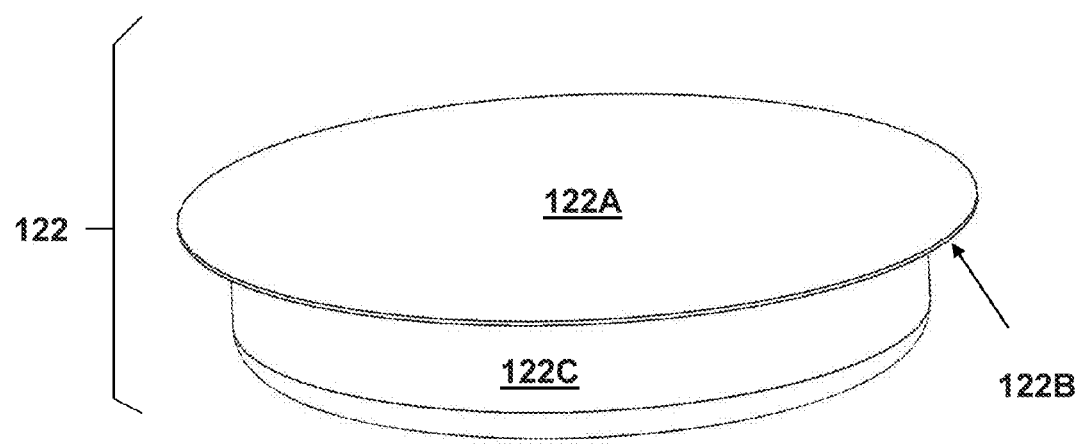
FIG. 4 is a perspective view of a pod for use in a beverage lid shell, such as the shell of FIG. 3D, in accordance with one particular embodiment of the present invention.
Figure 5A:
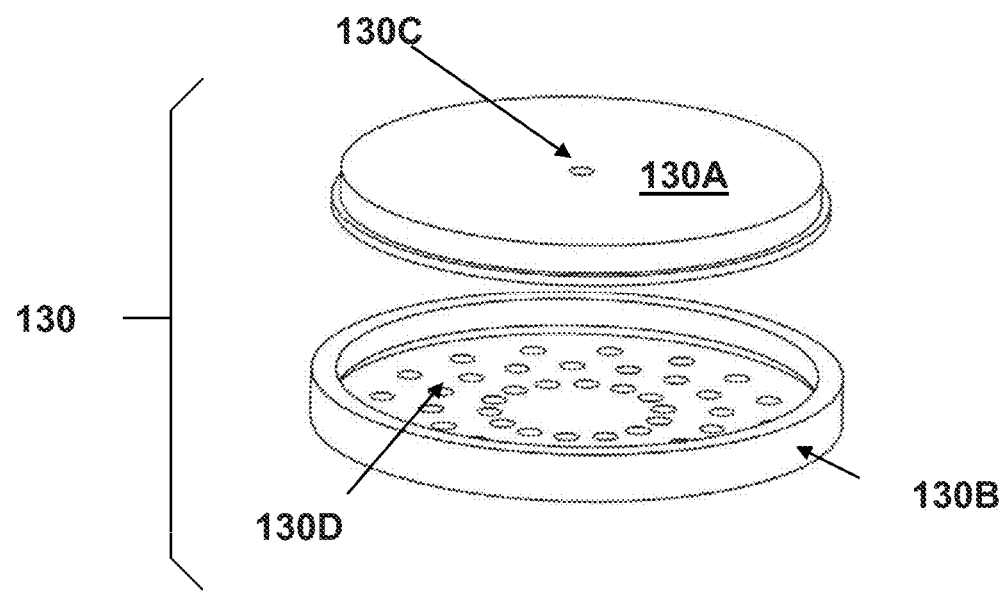
FIG. 5A is an exploded perspective view of a beverage circular water transfer screen used in accordance with one particular embodiment of the present invention.
Figure 5B:
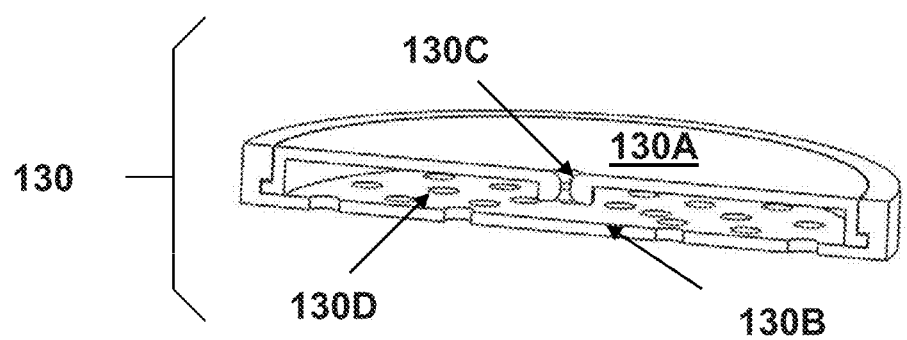
FIG. 5B is a partial cut-away of a side perspective view of a beverage circular water transfer screen in accordance with one particular embodiment of the invention.
Figure 5C:
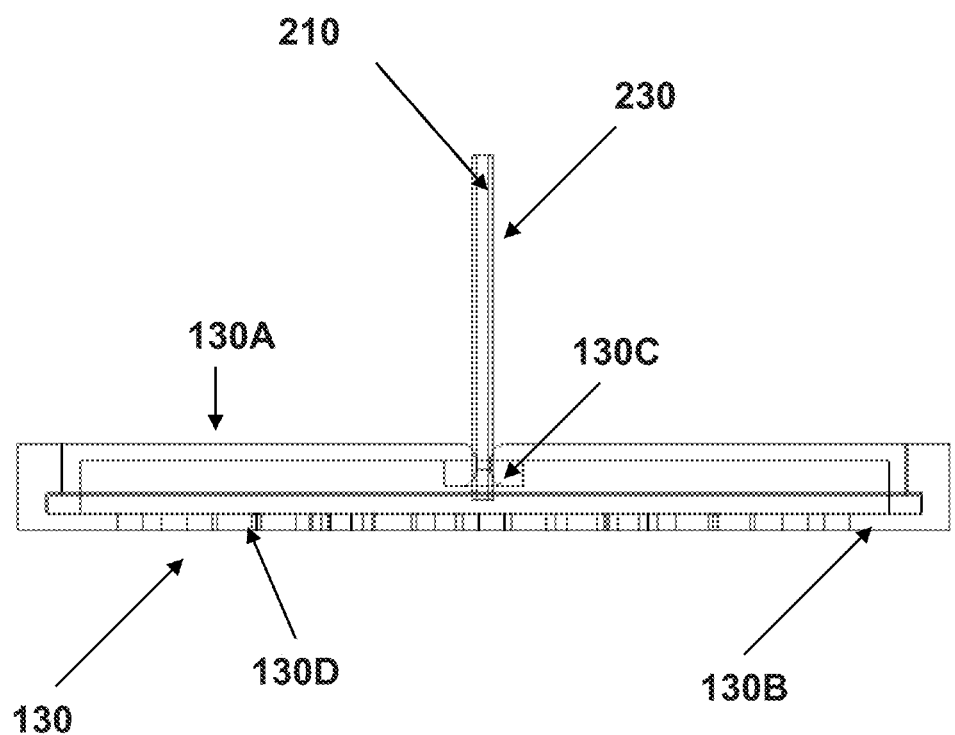
FIG. 5C is a partial, cut-away, side perspective view of a beverage circular water transfer screen with a one-way, self-sealing valve engaged with a tube having a rubber jacket.

Also, as can be seen more particularly from FIGS. 3C and 3D, the bottom surface of the well chamber 110A includes an innovative double-dome design. More particularly, a first, positive dome 115 includes a second, negative dome 117 formed in the center thereof. The goal of this double-dome design is to serve as drainage and siphon of the exiting hot infusion. At the bottom of the well chamber 110A, in the lowest level, is the base of the positive dome 115, which has a small depression forming the negative dome 117. The two domes were designed with two basic purposes: 1) To determine the level of exiting fluid of the infusion to avoid dripping after the brewing process is completed; and 2) To be a siphon to collect possible losses of various particles used in the preparation of the infusion such as coffee, tea, and premix and that could have escaped or lost from the beverage pod 122 for any reason.

As can be seen more particularly from FIGS. 2B, 3A and 3D, in the present preferred embodiment, the bottom face of the well chamber 110A includes a plurality of drainage holes 110B located through the positive dome 115, outside of the negative dome 117. In the particular embodiment shown, drainage holes 110B are provided through the dome 115, although more or fewer holes can be provided, as desired. The filtering process starts with the infusion coming out of the beverage pod 122. The liquid falls to the bottom of the well chamber 110A and runs throughout the spherical faces of the domes 115, 117. Once the liquid begins to fill the bottom of the well chamber 110A, the level rises until it reaches the edges of the exit holes 110B. Once the infusion reaches the holes 110B, it will exit the lid by either dripping or by following the external face of the negative dome to a central collection point. The siphon process created by the domes 115, 117 stops immediately once the internal level is lower than the exit's holes. It is natural that the beverage pod 122 keeps dripping internally, this internal dripping will be concentrated in the middle of the wetted beverage pod 122 due to gravity, and not under high pressure. If still dripping, the infusion will be collected in the depression forming the negative dome 117 in its internal side. This design will prevent external dripping once the brewing process ends.

Additionally, in one particular embodiment of the invention, the outside bottom surface of the well chamber 110A has a flat, circumferential (i.e., cylindrical) ring 110C to prevent contamination of the dome 117, as shown in FIG. 3D. This design was developed with the goal of separating the underside of the lid 100 from a flat surface, such as a table. The drainage point is set at a higher level so it cannot be contaminated by contact with external elements. Also, the flat circumferential ring 110C serves as a seal guide for the removable seal 114 that will be place at the bottom of the lid 100.

Figure 2A:
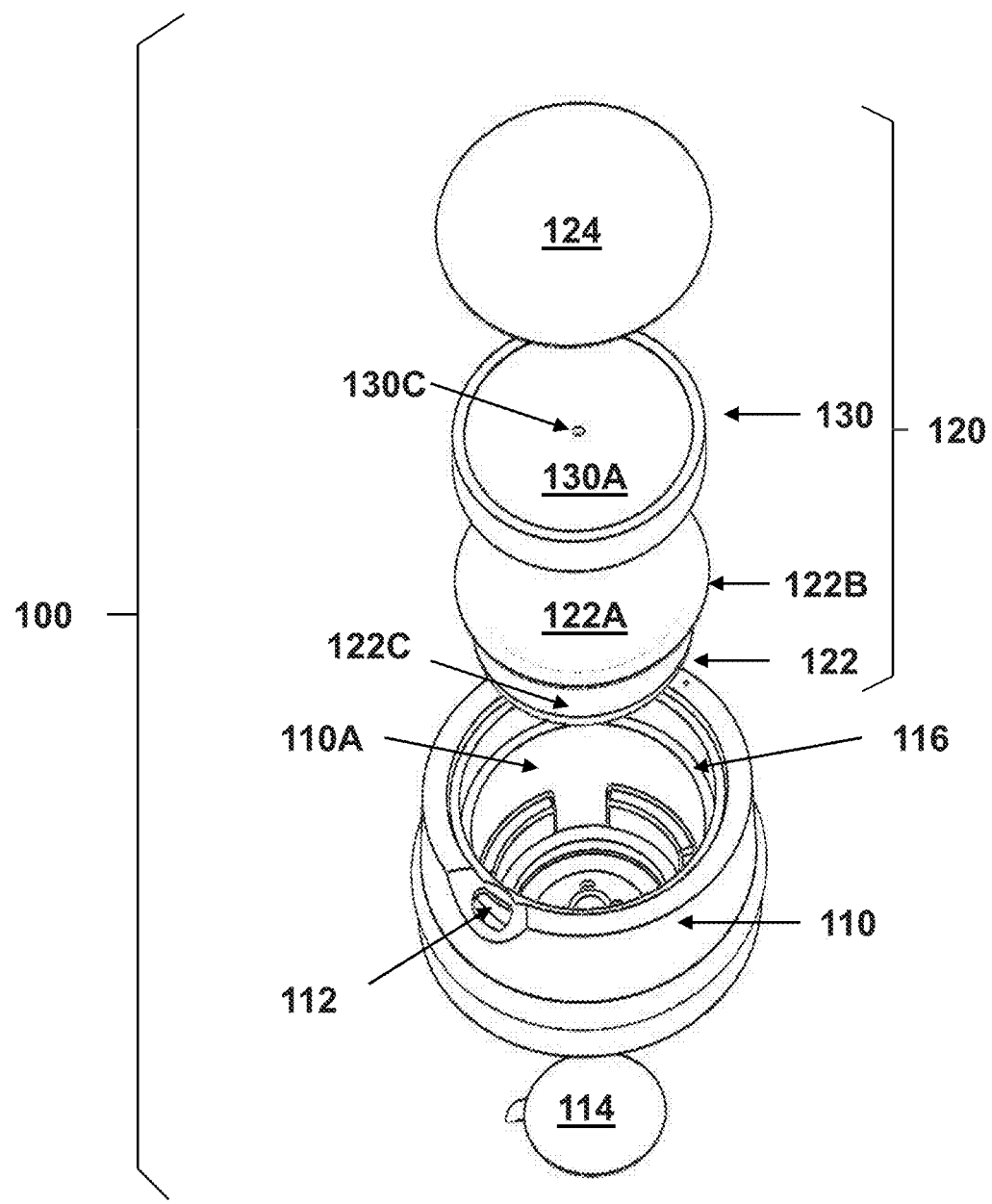
FIG. 2A is an exploded perspective view of a beverage lid in accordance with one particular embodiment of the present invention.
Figure 2B:
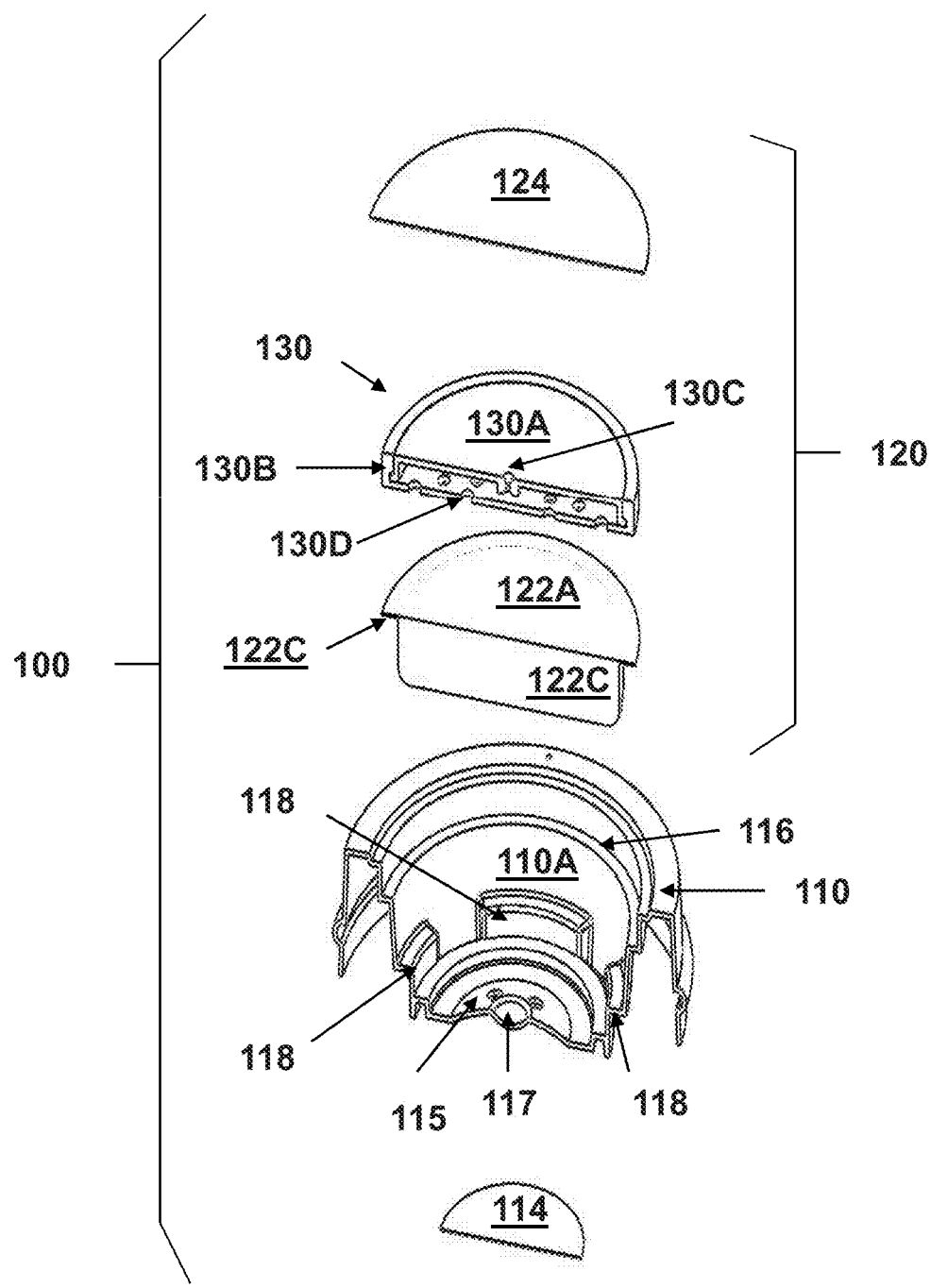
FIG. 2B is a partial cut-away of an exploded perspective view of a beverage lid in accordance with one particular embodiment of the present invention.

Referring back to FIGS. 1-5C, and more particularly to FIGS. 2A, 2B and 4, the beverage pod 122 is composed of an individual serving of product (the amount of which differs on intended strength, cup size, etc.) sealed into a permeable filtering material, which could be a presently available filter paper manufactured to market characteristics and standards. In one particular embodiment of the invention, the beverage pod 122 is cylindrical in design, with a circumferential rim 122B, as previously described in connection with the lip or shoulder 116 of the shell 110. In one particular embodiment of the invention, the beverage pod 122 has an average volumetric area so as to ensure that the same beverage pod 122 can be used to accommodate a maximum and/or minimum weight of different kinds of product, to obtain optimum results in the monodose infusions. The beverage pod includes a paper lid 122A, to isolate the internally contained product from possible foreign contaminants, making the dose 122C completely sealed.

Referring now to FIGS. 1-6A, a method for producing a brewed beverage by infusion using an individual serving brewed beverage lid, such as the lid 100, will now be described. The disclosed method utilizes the lid 100 in an easy and practical operation performed by the end user and favors the profitability of the hot beverage obtained through this system versus the classic, traditional dripping and filtering brewing systems. The lid 100 provides the end user with the same type of final infusion that can be obtained from large-scale coffee machines having traditional dripping and filtering brewing systems, but made by the individual serving.

To begin the process, a consumer selects a particular lid 100 that includes a beverage pod 122 of the beverage A, B or C, desired by the consumer. For example, a plurality of beverage lids 100 each containing a different content A, B or C, can be offered to a consumer, who selects the lid containing the desired flavor, strength, size and/or caffeination, in accordance with labeling on the lid, as desired. Step 1 of FIG. 6A. The lid 100 can offer personalized beverages for example, in the coffee line: organics, fair trade, decaf, gourmet, flavor coffee. In the tea line, black, green, flavored, etc., as well as chocolate and other premix.

Once the lid 100 containing the desired beverage A, B or C has been selected, the consumer removes the seal 114 from the bottom face of the lid 100 (Step 2 of FIG. 6A) and places the lid 100 on an appropriately sized cup 150, after which, the combination is placed on a targeted base 240 of the brewing machine 200. Step 3 of FIG. 6A. In one particular embodiment of the invention, the brewing process is performed in as will be described more particularly in connection with FIGS. 6B and 7.

Figure 6A:
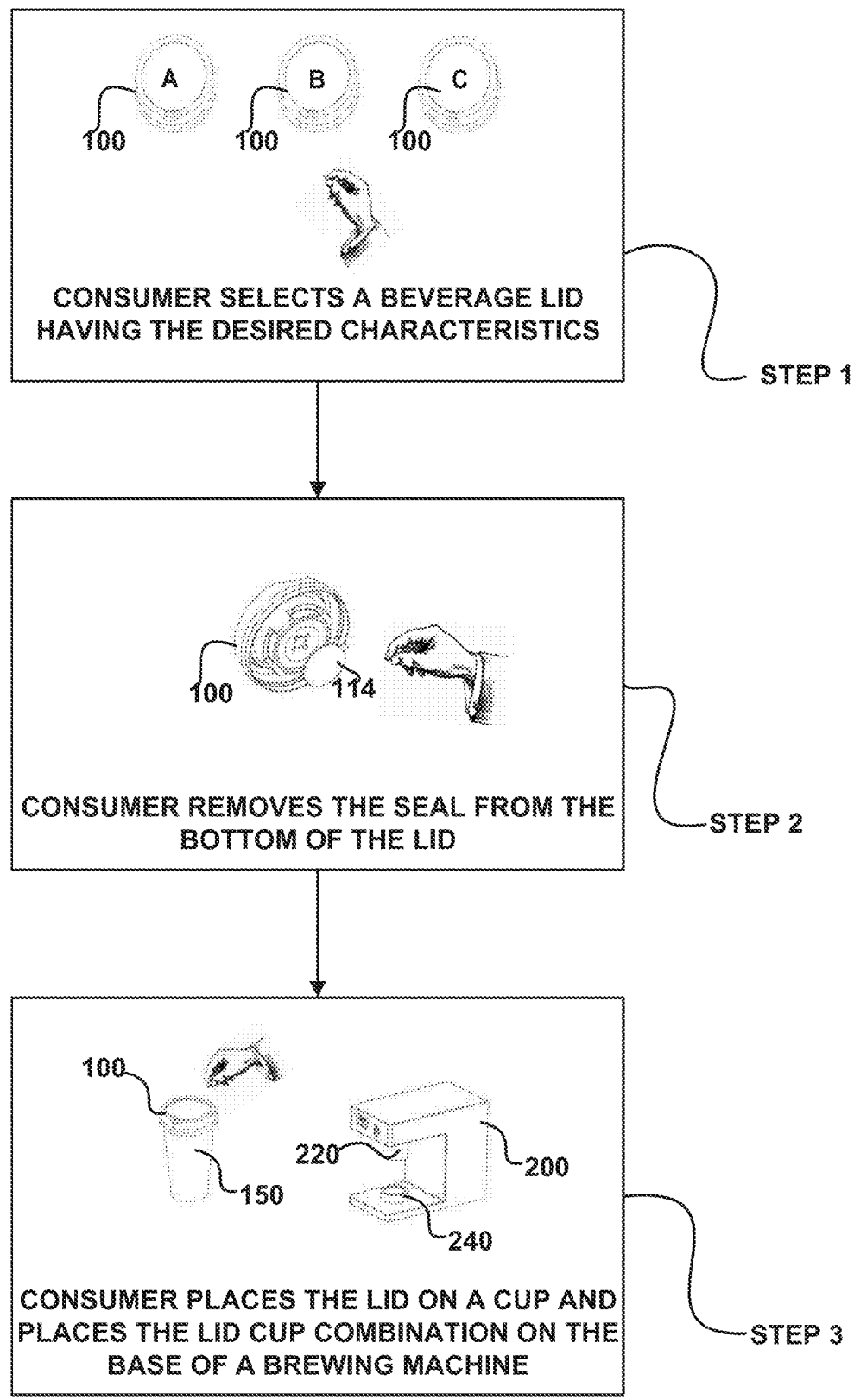
FIG. 6A illustrates a method for brewing a beverage in accordance with one particular embodiment of the present invention.
Figure 6B:
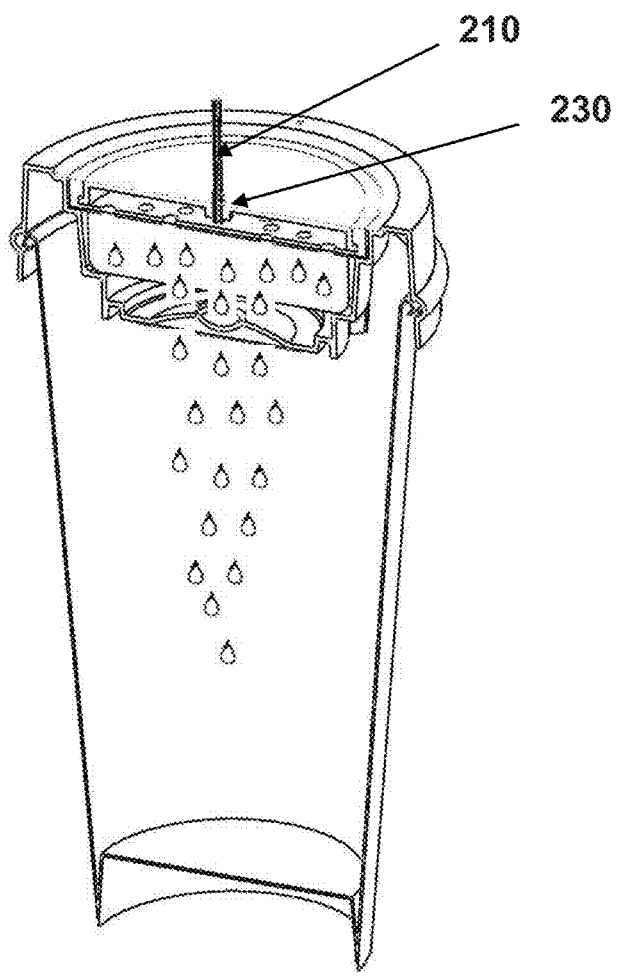
FIG. 6B is a side perspective, cut-away view useful in illustrating the brewing of a beverage using a lid, system and method in accordance with one particular embodiment of the present invention.
Figure 6C:
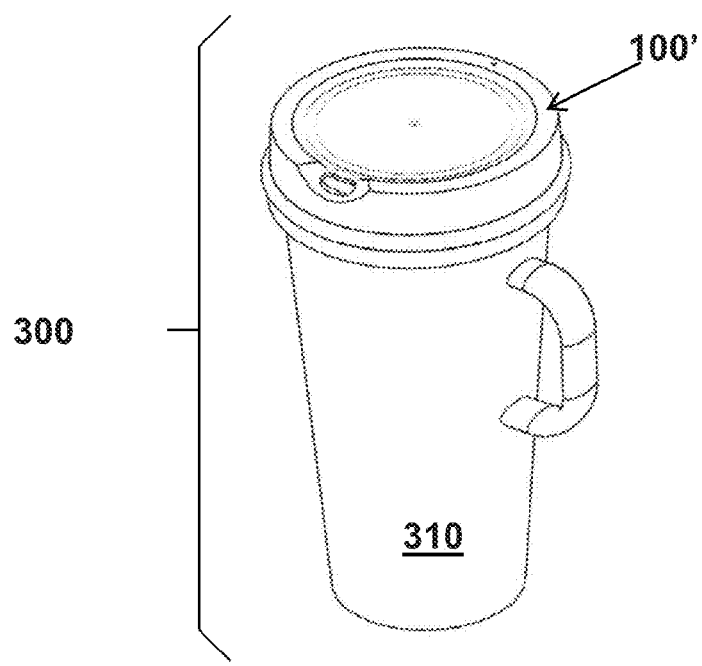
FIG. 6C is a side, perspective view of a beverage travel mug lid in accordance with one particular embodiment of the present invention.
Figure 6D:
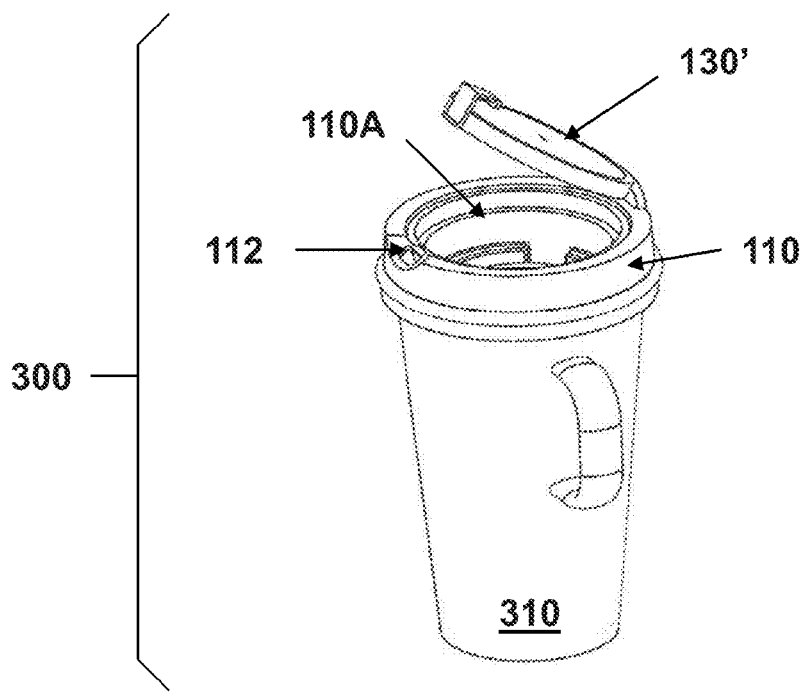
FIG. 6D is a side, perspective view of the beverage travel mug of FIG. 6C, wherein a portion of the lid has been opened to expose the coffee pod receiving chamber.

Referring now to FIGS. 6C and 6D, there is shown another embodiment of a beverage brewing lid useful for brewing an individual serving of a product. More particularly, FIGS. 6C and 6D show a travel mug or cup arrangement 300 that can be used in accordance with the principles of the present invention. The travel mug 300 includes a reusable lid 100' that is seated on a cup 310. In one particular embodiment of the invention, the reusable lid 100' includes all of the elements of the lid 100, described hereinabove, including, but not limited to a shell 110, and the circular water transfer screen assembly 130', which contains all of the elements described in connection with the water transfer screen assembly 130 of FIGS. 2A, 5A, 5B and 5C. The circular water transfer screen assembly 130' can be hingedly attached and or include snap fittings to permit closure of the assembly 130' over the well chamber 110A. In a system using a travel mug 300, instead of selecting a prepackaged, individual serving lid 100, the consumer selects a desired beverage pod 122 from a plurality of beverage pods 122 offered, and places the beverage pod 122 in the well chamber 110A of the lid 100'. The consumer then closes the water transfer screen assembly 130 over the top of the pod 122 contained in the well chamber 110A. The beverage travel mug 300, loaded with the selected beverage pod 122, is now coupled with the base or cup (i.e., an insulated travel mug) with which the reusable lid is regularly associated.

As with the embodiment described in connection with the lid 100 of FIGS. 1-6A, once the lid 100' containing the beverage pod 122 is placed onto a cup or vessel 310, the consumer places the assembly 300 onto a targeted base of a brewing machine (240 of 200, as shown in Step 3 of FIG. 6A), selects a setting denoting the size he or she wishes to have (For example, 1, 2, 3; low, medium or high; or light, regular or strong, etc) and presses a start button on the brewing machine (200 of FIG. 6A) to initiate the brewing process.

In one particular embodiment of the invention, at the end of the brewing process, the machine informs the consumer or otherwise generates a message for the consumer, indicating that the consumer's infusion or beverage is ready. Note that, technically, the method of the instant invention provides a beverage that is an infusion, since the water is heated separately from the product. In particular, water is heated and is poured into the lid 100 (See FIG. 6B), wherein the water gets to the product through a soaking process, i.e., by shower. This infusion is classified as dripping under the filtration method, since the product used to obtain the infusion is retained in a nylon, fabric or paper screen.

As can be seen from FIGS. 6A-6D and 7, in the instant invention, the brewing process occurs inside the lid 100. Referring now to FIGS. 1-7, a method for performing a brewing process using a lid 100, 100', in accordance with one particular embodiment of the present invention, will now be described. At the moment the start button on the brewing machine 200 is pressed (Step 4 of FIG. 7), head 220 is moved to the top of the flat surface of the lid 100, 100'. Step 5 of FIG. 7. This is done to maintain a rigid and secured cup between the targeted base 240 and the head 220. Then, a connection is made between the brewing machine 200 and the lid 100, 100'. Step 6 of FIG. 7. This connection is made through the head 220 of the brewing machine 200, which possesses a tube 210, which may be covered by a rubber jacket 230, and which descends and passes through a seal and/or sticker 124 of the lid 100, 100' and enters the circular water transfer screen assembly 130, 130', using a one-way, self-sealing valve 130C of the circular gate lid 130A. Once this connection is established, the infusion process is ready to start and the machine will begin pouring hot water to the lid 100, 100'. The brewing machine 200 will stop the brewing process depending upon the beverage selection initially made by the consumer.

More particularly, the brewing machine 200 pours hot water into the circular water transfer screen assembly 130, 130'. The water enters the chamber inside the circular water transfer screen assembly 130, 130' above the water transfer screen ring 130B, and is, simultaneously, distributed internally thereto, and drains, therefrom, in the form of scattered showers through the holes 130D of the water transfer screen ring 130S.

The hot water falling from the holes 130D of the circular water transfer screen assembly 130, 130' will fall to the upper surface 122A of the beverage pod 122, the outer portions of which are formed of a permeable material, such that the internal product will become soaked. As the amount of water at the beverage pod 122 increases, so does the permeability of the beverage pod 122, which starts draining under the effect of gravity, thus grabbing the essence, flavor and aroma of the product contained in the beverage pod 122.

The infused liquid will fall to the lower portion of the well chamber 110A of the lid 100, 100', where the collection domes 115, 117 and siphon are found. From there, the infused liquid will start the exit process to the cup.

As discussed above, the hot water transfer process will end once the consumer's preselected choice made on the user interface panel of the brewing machine 200 has been reached. At that time, the brewing machine ceases to pour water into the lid 100, after which the lid 100 stops draining internally and the dripping inside the cup stops, once the water is under the border of the exit holes. At this point, the tube 210, with rubber jacket 230, and head 220 of the brewing machine 200 are simultaneously disconnected from the lid 100, 100' and retract to their original position. Once freed of the head 220, the brewing machine 100 can, optionally, generate a signal or message indicating that the brewing process is over and that the cup can be removed. At such time, the consumer can remove the cup from the brewing machine 200 and can consume the freshly made, personalized single serving beverage. It is important to note that the beverage is consumed using a hole 112 in the lid 100,100', without removing the used beverage pod 122 and/or product from the well chamber 110A. Thus, the user drinks the prepared beverage through a lid having the beverage pod, and product remains, still intact.

Figure 7:
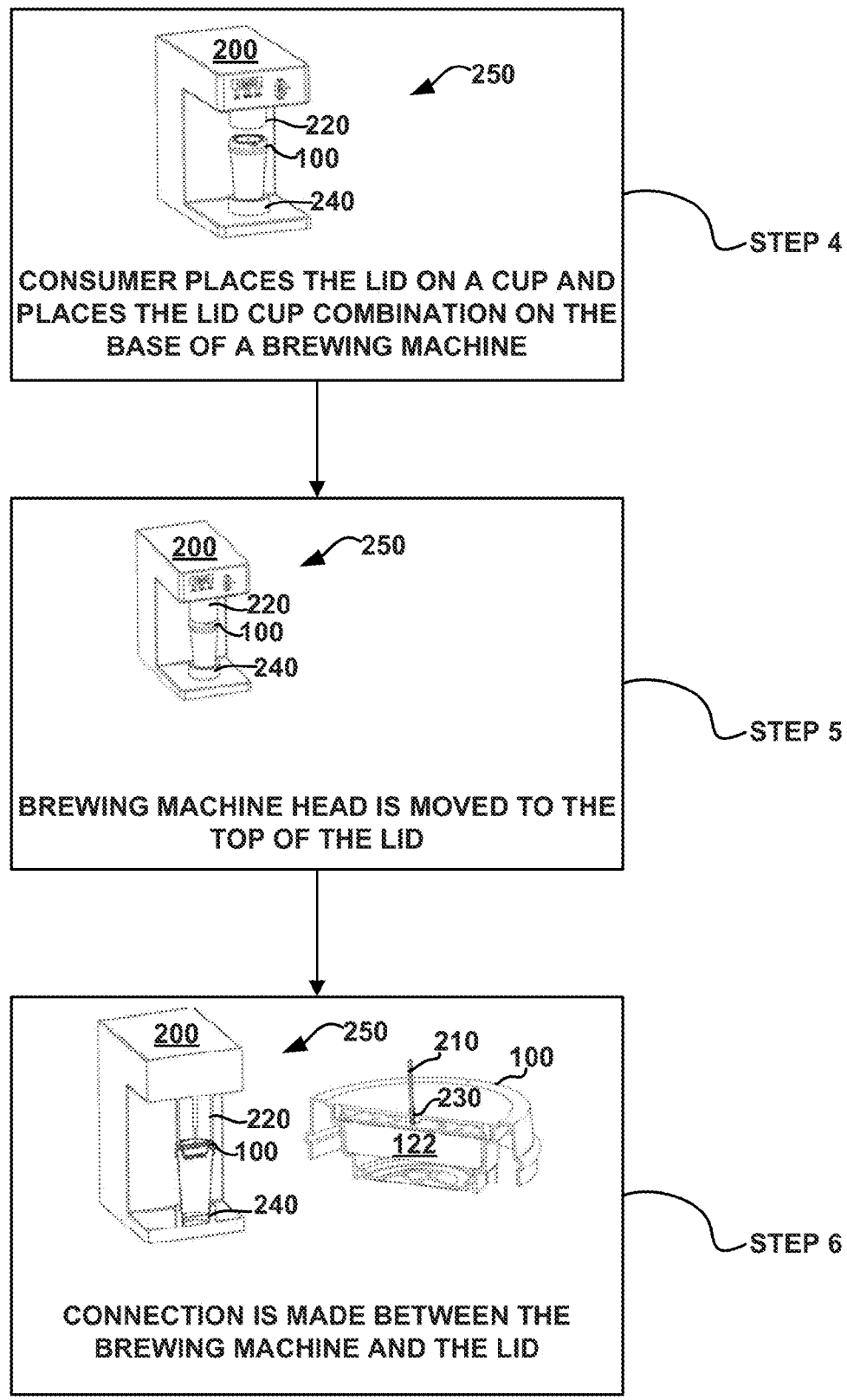
FIG. 7 illustrates a method for brewing a beverage in accordance with another particular embodiment of the present invention.

As discussed herein above, the brewing method used in connection with the present invention is a drip method. As such, the internal components of the brewing machine can be substantially similar to the traditional machines utilizing this method. However, the brewing machine 200 will be differentiated from such prior art machines by the addition of control and command technology to make the brewing machine 200 capable of transferring hot water to the lid 100, 100'. To this end, the brewing machine 200 can include the following:

a mechanism for moving the head 220 and a rubber jacketed tube 210, therein, to the top, flat surface of the lid 100, 100' at the moment a start button is pressed;

a targeted base 240 of the brewing machine 200 that is used as a guide and support for the cup before starting the brewing process;

optionally, a selector to determine the level of liquid desired in the cup, (e.g., 1, 2, 3; small, medium or large; light, regular or strong beverage);

In the particular embodiment shown in FIG. 7, a system 250 is provided for brewing an individual serving of a beverage in accordance with one particular embodiment of the invention. The system 250 includes a lid 100, as described in connection with FIGS. 1-5B and a brewing machine 200, as described in connection with FIGS. 6A-7. Note that, the system 250 could additionally be used in connection with the travel mug 100' of FIGS. 6C and 6D, as described herein. The present system is advantageous in that:

hot water is poured into the lid to brew the desired beverage;

no excessive waste is made, since the whole process is integrated into the existing beverage lid without the need for separate pod cups that are used in the process, but discarded prior to even removing the beverage from the brewing machine; and there is no need to use several elements unnecessary to brewing a final cup of coffee.

The inventive brewed beverage lid of the present invention is a very economical product to make and is easy to stack, store and shelf. In particular, its innovative design makes it easier to stack up, and its size and one piece configuration reduces the spaces for shelving considerably.

It can be seen that the brewed beverage lid and system of the instant invention provide certain advantages. For example, the system of the present invention is easily utilized by the consumer. Lids in accordance with the invention can be distributed in a variety of locations, specially in restaurants, convenience stores, grocery stores, repair shops, boutiques, offices, hotels, waiting rooms, etc, without the need for a sales person. The beverage can be prepared by the consumer using only a brewing machine, as described herein. The simplicity of the lid and its corresponding ease in production, storage and distribution provides a low cost product that produces a high quality beverage for the user.

Additionally, the system of the present invention provides a faster, simpler way of brewing a beverage at a much cheaper price to the end user when compared to those ones available in the market of the coffee shops. It is a safer product, as the brewed beverage is produced with less human handling, i.e., producing a final cup of coffee from the machine without the need to either remove a hot water bottle or close the lid after finishing the brewing process. In one particular embodiment of the invention, it is disposable, thus permitting the consumer to safely dispose of the used portions of the product after the beverage has been made and consumed. Additionally, it is more environmentally friendly than other individual dose beverage products that produce an empty pod container that is separate and apart from the beverage vessel lid. By going directly on top of the cup, the pod/lid combination of the present invention differs from other "pod" systems on the market, thus eliminating the need to dispose of separate bottles, cartridges or elements other than the beverage lid itself.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

I claim:

1. An individual serving brewed beverage lid, comprising:
    a shell including a well chamber formed therein and a rim surrounding the well chamber, said rim including an opening therethrough;
    a beverage pod including an individual dose of product, said beverage pod being sized to be received in said well chamber, including an upper surface disposed distally from a floor of said well chamber;

a feed mechanism disposed above said beverage pod in the beverage lid, said feed mechanism being configured to distribute a liquid received in said feed mechanism to the upper surface of said beverage pod, said feed mechanism including only a single inlet port for receiving hot water into said feed mechanism, said single inlet port including a self-sealing valve configured to receive a fluid tube therethrough to provide hot water into said feed mechanism and to automatically close after the fluid tube has been removed therefrom;

said feed mechanism including a screen assembly by which a liquid provided to said screen assembly is gravity fed to the upper surface of said beverage pod; and said screen assembly includes a gate lid, a transfer screen and a screen chamber formed therebetween, such that a liquid poured through said gate lid is provided into said screen chamber and to said transfer screen.

2. The lid of claim 1, wherein the beverage pod is part of a beverage kit that is received into the well chamber.

3. The lid of claim 2, wherein the beverage pod is sized to be received in said well chamber such that the beverage pod does not impede consumption of a beverage by a consumer through said opening while said beverage pod is in said well chamber.

4. The lid of claim 2, wherein said screen assembly is disposed in said beverage kit.

5. The lid of claim 1, wherein the self-sealing valve is a one-way, self-sealing valve configured to receive the fluid tube therethrough to provide hot water into the screen chamber between the gate lid and the transfer screen.

6. The lid of claim 1, wherein the bottom surface of the well chamber includes a plurality of drainage holes located through a positive dome formed in the floor of the well chamber.

7. The lid of claim 6, wherein the positive dome surrounds a negative dome additionally formed in the floor of the well chamber.

8. A method of providing an individual serving of a beverage to be brewed, comprising the steps of:

providing a beverage brewing lid including:

a shell including a well chamber formed therein and a rim surrounding the well chamber, said rim including an opening therethrough;

a beverage pod including an individual dose of product, said beverage pod being sized to be received in said well chamber, including an upper surface disposed; distally from a floor of said well chamber;

a feed mechanism disposed above said beverage pod in the beverage lid, said feed mechanism being configured to distribute a liquid received in said feed mechanism to the upper surface of said beverage pod, said feed mechanism including only a single inlet port for receiving hot water into said feed mechanism, said single inlet port including a self-sealing valve configured to receive a fluid tube therethrough to provide hot water into said feed mechanism, said self-sealing valve configured to create a water seal between said valve and the fluid tube;

said feed mechanism including a screen assembly by which hot water provided to said screen assembly is gravity fed to the upper surface of said beverage pod; and said screen assembly including a gate lid, a transfer screen and a screen chamber formed therebetween, for producing a one-way, self sealing valve when hot water is poured through said assembly lid into said screen chamber.

9. The method of claim 8, comprising the further steps of:
placing the beverage brewing lid over a cup; and
infusing the beverage pod with hot water to provide a brewed beverage.

10. The method of claim 8, wherein the beverage pod is part of a beverage kit that is received into the well chamber.

11. The method of claim 10, wherein the beverage pod is sized to be received in said well chamber such that the beverage pod does not impede consumption of a beverage by a consumer through said opening while said beverage pod is in said well chamber.

12. The method of claim 10, wherein said feed mechanism includes a screen assembly disposed in said beverage kit.

13. The method of claim 8, wherein the self-sealing valve is a one-way, self-sealing valve configured to receive the delivery tube therethrough, to provide hot water into the screen chamber between the gate lid and the transfer screen, the delivery tube including a rubber jacket.

14. The method of claim 8, wherein the bottom surface of the well chamber includes a plurality of drainage holes located through a positive dome formed in the floor of the well chamber.

15. The method of claim 6, wherein the positive dome surrounds a negative dome additionally formed in the floor of the well chamber.

16. An individual serving beverage kit sized to be received in a beverage lid, the beverage lid including a shell having a well chamber formed therein and a rim surrounding the well chamber, the rim including an opening therethrough, the individual serving beverage kit comprising:

a beverage pod including an individual dose of product, said beverage pod being sized to be received in the well chamber, said pod including an upper surface;

a feed mechanism disposed above said beverage pod in the beverage kit, said feed mechanism being configured to distribute hot water received in said feed mechanism to the upper surface of said beverage pod, said feed mechanism including a gate lid having only a single inlet port for receiving hot water into said feed mechanism, said feed mechanism further including a water transfer screen disposed below the gate lid and above the upper surface of said beverage pod and including a plurality of holes therethrough, said gate lid and water transfer screen defining a free space therebetween.

17. The kit of claim 16, wherein the feed mechanism includes a one-way, self sealing valve configured to receive a delivery tube including a rubber jacket therethrough, to provide hot water into the screen chamber between the gate lid and the transfer screen.

18. An individual serving brewed beverage lid, comprising:

a shell including a well chamber formed therein and a rim surrounding the well chamber, said rim including an opening therethrough;

an individual serving beverage kit according to claim 16 received in said well chamber.

19. The individual serving brewed beverage lid of claim 18, wherein the feed mechanism includes a one-way, self sealing valve configured to receive a delivery tube including a rubber jacket therethrough, to provide hot water into the screen chamber between the gate lid and the transfer screen.

* * * * *